US012142283B2

(12) United States Patent
Cappello et al.

(10) Patent No.: US 12,142,283 B2
(45) Date of Patent: Nov. 12, 2024

(54) AUDIO PROCESSING

(71) Applicant: Sony Interactive Entertainment Inc., Tokyo (JP)

(72) Inventors: Fabio Cappello, London (GB); Oliver Hume, London (GB); Marina Villanueva Barreiro, Acoruña (ES)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/519,831

(22) Filed: Nov. 5, 2021

(65) Prior Publication Data

US 2022/0148604 A1 May 12, 2022

(30) Foreign Application Priority Data

Nov. 10, 2020 (GB) ...................................... 2017689

(51) Int. Cl.
*G10L 19/008* (2013.01)
*G10L 15/06* (2013.01)
*G10L 15/07* (2013.01)
*G10L 19/00* (2013.01)
(Continued)

(52) U.S. Cl.
CPC ............ *G10L 19/008* (2013.01); *G10L 25/30* (2013.01)

(58) Field of Classification Search
CPC ....... G10L 19/008; G10L 19/00; G10L 19/18; G10L 25/30; G10L 15/063; G10L 15/07; G10L 15/06; G06N 3/0455; G06N 3/045; G06N 3/04; G06N 3/0475; G06F 3/017; G06F 3/165; G06F 3/167; G06F 3/1454; G06F 3/011; A63B 24/0084; A63F 13/211; A63F 13/352
USPC .... 704/500–504; 706/15, 20, 21, 22, 24, 25; 381/1–23
See application file for complete search history.

(56) References Cited

U.S. PATENT DOCUMENTS

2003/0125940 A1 7/2003 Basson
2011/0099009 A1* 4/2011 Zopf ....................... G10L 21/00 704/E21.001
2015/0269933 A1 9/2015 Yu
(Continued)

FOREIGN PATENT DOCUMENTS

EP 3998604 A1 5/2022
WO 2021040850 A1 3/2021

OTHER PUBLICATIONS

Extended European Search Report for corresponding EP Application No. 21205409.2, 9 pages, dated Apr. 20, 2022.
(Continued)

*Primary Examiner* — Leshui Zhang
(74) *Attorney, Agent, or Firm* — Matthew B. Dernier, Esq.

(57) ABSTRACT

Audio communication apparatus comprises a set of two or more audio communication nodes; each audio communication node comprising: an audio encoder controlled by encoding parameters to generate encoded audio data to represent a vocal input generated by a user of that audio communication node, the encoded data being agnostic to which user who generated the vocal input; and an audio decoder controlled by decoding parameters to generate a decoded audio signal as a reproduction of a vocal signal generated by a user of another of the audio communication nodes, the decoding parameters being specific to the user of that other of the audio communication nodes.

12 Claims, 10 Drawing Sheets

(51) Int. Cl.
*G10L 19/18* (2013.01)
*G10L 25/30* (2013.01)

(56) References Cited

U.S. PATENT DOCUMENTS

| | | | | |
|---|---|---|---|---|
| 2017/0069306 | A1* | 3/2017 | Asaei | G10L 19/0018 |
| 2019/0318741 | A1* | 10/2019 | Songa | G10L 15/22 |
| 2020/0234725 | A1* | 7/2020 | Garbacea | G06N 3/084 |
| 2021/0327460 | A1* | 10/2021 | Qian | G10L 25/30 |

OTHER PUBLICATIONS

Cernak Milos, et al., “Phonological vocoding using artificial neural networks” IEEE International Conference on Acoustics, Speech and Signal Processing (ICASSP), 5 pages, Apr. 19, 2015 (See Non-Pat Lit # 1).
Combined Search and Examination Report for corresponding GB Application No. 2017689.7, 6 pages, dated May 10, 2021.
Examination Report for corresponding GB Application No. 2017689.7, 3 pages, dated Dec. 21, 2022.
Communication Pursuant to Article 94(3) EPC for corresponding EP Application No. 21205409.2, 7 pages, dated Jul. 11, 2024.
Jennifer Williams et al., “Learning Disentangled Phone and Speaker Representations in a Semi-Supervised VQ-VAE Paradigm,” ARXIV.org, Centre for Speech Technology Research, the University of Edinburgh, Cornell University Library, 5 pages, Oct. 21, 2020 (for relevancy, see Non-Pat. Lit. #1).

* cited by examiner

AUDIO PROCESSING

BACKGROUND

This disclosure relates to audio processing.

Audio rendering may be performed by various techniques so as to model the audio properties (such as reverberation, attenuation and the like) of a simulated or virtual environment. One example of a suitable technique may be referred to as ray-tracing. This is a technique to generate sound for output at a virtual listening location within the virtual environment by tracing so-called rays or audio transmission paths from a virtual audio source and simulating the effects of the rays encountering objects or surfaces in the virtual environment.

In a physical reality, sound from an audio source hits an object and is absorbed and/or reflected and/or refracted, with the transmission path potentially reaching a listening position such as a user's ear or a microphone. In contrast, in audio rendering systems using audio ray-tracing, the simulation is performed by emitting virtual or simulated "rays" from a virtual listening position such as a virtual microphone and determining what interactions they undergo when they reach an object or a virtual audio source, either directly or after having hit an object or surface.

SUMMARY

It is in this context that the present disclosure arises.

The present disclosure provides audio communication apparatus comprising a set of two or more audio communication nodes;

each audio communication node comprising:

an audio encoder controlled by encoding parameters to generate encoded audio data to represent a vocal input generated by a user of that audio communication node, the encoded data being agnostic to which user who generated the vocal input; and an audio decoder controlled by decoding parameters to generate a decoded audio signal as a reproduction of a vocal signal generated by a user of another of the audio communication nodes, the decoding parameters being specific to the user of that other of the audio communication nodes.

The present disclosure also provides a machine-implemented method of audio communication between a set of two or more audio communication nodes, the method comprising:

at each audio communication node, generating, in dependence upon encoding parameters, encoded audio data to represent a vocal input generated by a user of that audio communication node, the encoded data being agnostic to which user who generated the vocal input; and at each audio communication node, generating, in response decoding parameters, a decoded audio signal as a reproduction of a vocal signal generated by a user of another of the audio communication nodes, the decoding parameters being specific to the user of that other of the audio communication nodes.

The present disclosure also provides a computer-implemented method of artificial neural network (ANN) training to provide an audio encoding and/or decoding function, the method comprising:

training an ANN to act as a user-agnostic audio encoder;

using the user-agnostic audio encoder to generate user-agnostic encoded audio data in respect of an input vocal signal for a given user, training an ANN to decode the user-agnostic encoded audio data to approximate the input vocal signal for the given user.

Various further aspects and features of the present disclosure are defined in the appended claims and within the text of the accompanying description.

BRIEF DESCRIPTION OF THE DRAWING

Embodiments of the disclosure will now be described, by way of example only, with reference to the accompanying drawings, in which.

DETAILED DESCRIPTION

Example Hardware and Software Overview

Figure 1:
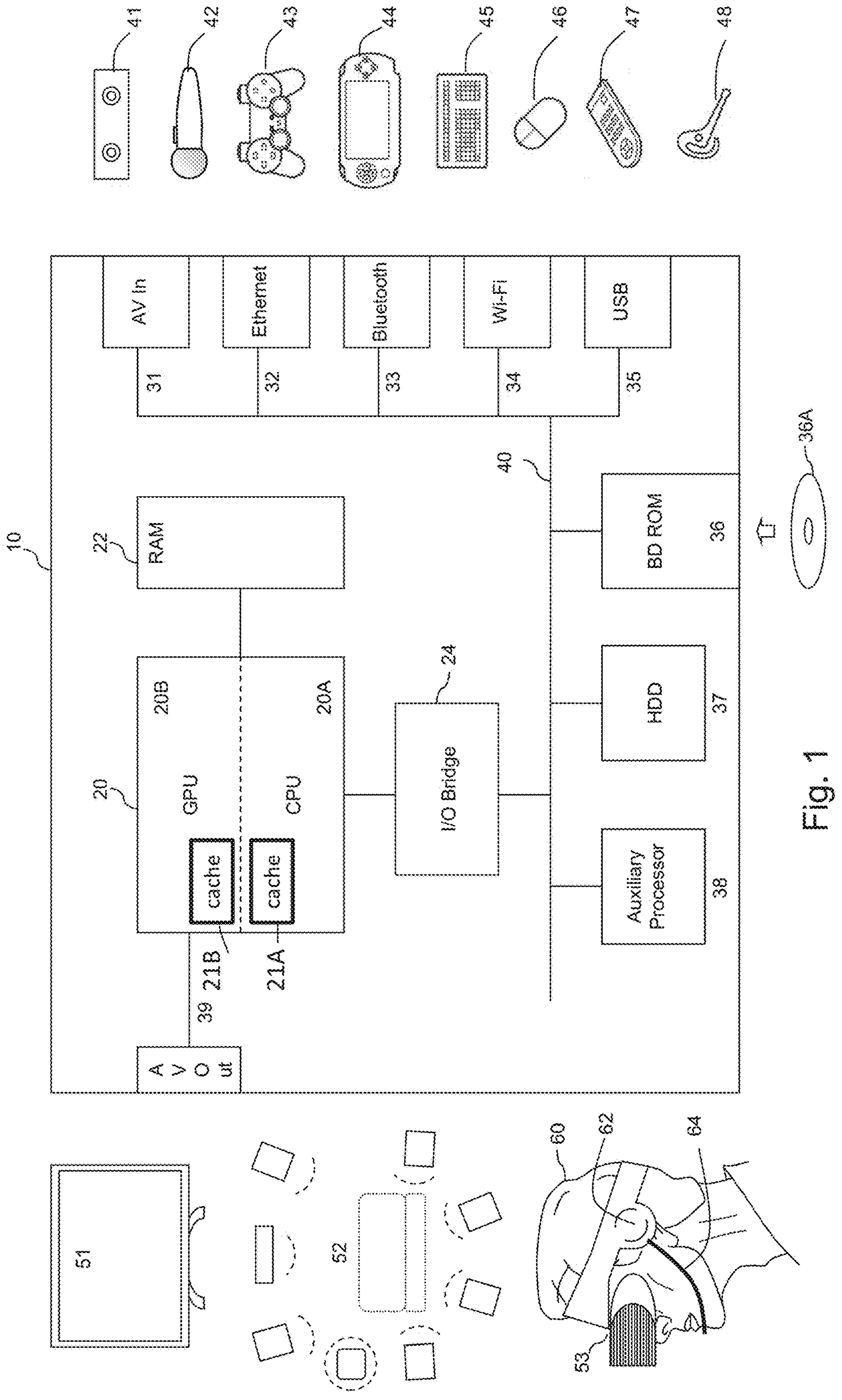
FIG. 1 schematically illustrates an example entertainment device.

The techniques to be discussed here can fall into two example stages of processing.

An entertainment device provides audio communication between a user associated with that entertainment device and users associated with other entertainment devices connected to that entertainment device. In other words, the entertainment device acts as a terminal for a particular user to a communication with users at other terminals. The connection between terminals may be any one or more of a direct wired connection, a local Wi-Fi or ad hoc wireless connection, a connection via the Internet or the like.

At a particular terminal, the local user may speak into a microphone and here received audio via an output transducer such as one or more earpieces. Examples will be described below.

These are examples of processing which takes place at the entertainment device, for example during execution of a computer game program, which may be executed in cooperation with execution at the one or more other networked or connected terminals.

The use of an entertainment device is just one example. The terminals could be, for example, portable communication devices such as mobile telephony devices, so-called smart phones, portable computers, desktop or less-portable computers, smart watches or other wearable devices, or any other generic data processing devices associated (quasi-permanently or temporarily) with particular users. The execution of a computer game is also just one example. There is no requirement for execution of specific computer software at any other terminals, and similarly no requirement for cooperative or collaborative execution of corresponding software at each of the terminals. Audio communication between the terminals can be on the basis of a single user communicating with another single user or can be on a broadcast basis so that each user within a cohort of users associated with connected devices can hear contributions to a conversation made by any other user within the cohort.

Each entertainment device (in the specific example discussed here) provides audio encoding and decoding capabilities to allow a digitised version of the analogue audio signal generated by (for example) the microphone to be encoded for transmission to other such devices and to allow the decoding of an encoded signal received from one or more other devices. The encoder and decoder rely on encoding and decoding parameters which, in some example embodiments to be discussed below, may include so-called weights controlling the operation of a machine learning system. Processes to generate these encoding and decoding parameters may be carried out in advance of the use of those parameters by a separate data processing apparatus, though in other embodiments the entertainment device may perform these functions, even during gameplay.

With these considerations providing technical context, an example entertainment device will now be described with reference to FIG. 1. An example of a separate data processing apparatus, for example to be used for parameter, will be described with reference to FIG. 16.

Example Entertainment Device

Referring now to the drawings, FIG. 1 schematically illustrates the overall system architecture of an example entertainment device such as a games console. A system unit 10 is provided, with various peripheral devices connectable to the system unit.

The system unit 10 comprises a processing unit (PU) 20 that in turn comprises a central processing unit (CPU) 20A and a graphics processing unit (GPU) 20B. The PU 20 has access to a random access memory (RAM) unit 22. One or both of the CPU 20A and the GPU 20B may have access to a cache memory, which may be implemented as part of the respective device and/or as a portion of the RAM 22.

The PU 20 communicates with a bus 40, optionally via an I/O bridge 24, which may be a discrete component or part of the PU 20.

Connected to the bus 40 are data storage components such as a hard disk drive 37 (as an example of a non-transitory machine-readable storage medium) and a Blu-ray® drive 36 operable to access data on compatible optical discs 36A. In place of or in addition to the hard disk drive 37, a so-called solid state disk device (which is a solid state device which is formatted to mimic a hard drive's storage structure in operation) or a flash memory device may be used. Additionally the RAM unit 22 may communicate with the bus 40.

In operation, computer software to control the operation of the device 10 may be stored by the BD-ROM 36A/36 or the HDD 37 (both examples of non-volatile storage) and is executed by the PU 20 to implement the methods discussed here, possibly with a temporary copy of the computer software and/or working data being held by the RAM 22.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation® Eye; wand-style videogame controllers 42 such as the PlayStation® Move and conventional handheld videogame controllers 43 such as the DualShock® 4; portable entertainment devices 44 such as the PlayStation® Portable and PlayStation® Vita; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 (HMD) worn by a user 60, for example communicating with the device by a wired or wireless connection and powered either by a battery power source associated with the HMD or by power provided using such a wired connection.

The HMD may have associated headphones 62 (for example, a pair of earpieces) to provide mono and/or stereo and/or binaural audio to the user 60 wearing the HMD. A microphone 64, such as a boom microphone as drawn, depending from the headphones 62 or a supporting strap or mount of the HMD, may be provided to detect speech or other audio contributions from the user 60.

Therefore, the arrangement of FIG. 1 provides at least three examples of arrangements for audio communication by the user 60, namely (i) the earphones 62 and microphone 64; (ii) the headset 48; and (iii) a headphone connection to the hand-held controller 43.

In more detail, regarding processing, the CPU 20A may comprise a multi-core processing arrangement, and the GPU 20B may similarly provide multiple cores, and may include dedicated hardware to provide so-called ray-tracing, a technique which will be discussed further below. The GPU cores may also be used for graphics, physics calculations, and/or general-purpose processing.

Optionally in conjunction with an auxiliary audio processor (not shown), the PU 20 generates audio for output via the AV output 39. The audio signal is typically in a stereo format or one of several surround sound formats. Again this is typically conveyed to the television 51 via an HDMI® standard connection. Alternatively or in addition, it may be conveyed to an AV receiver (not shown), which decodes the audio signal format and presented to a home cinema system 52. Audio may also be provided via wireless link to the headset 48 or to the hand-held controller 43. The hand held controller may then provide an audio jack to enable headphones or a headset to be connected to it.

Finally, as mentioned above the video and optionally audio may be conveyed to a head mounted display 53 such as the Sony® PSVR display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

In operation, the entertainment device may operate under the control of an operating system which may run on the CPU 20A, the auxiliary processor 38, or a mixture of the two. The operating system provides the user with a graphical user interface such as the PlayStation ® Dynamic Menu. The menu allows the user to access operating system features and to select games and optionally other content.

Upon start-up, respective users are asked to select their respective accounts using their respective controllers, so that optionally in-game achievements can be subsequently accredited to the correct users. New users can set up a new account. Users with an account primarily associated with a different entertainment device can use that account in a guest mode on the current entertainment device.

Once at least a first user account has been selected, the OS may provide a welcome screen displaying information about new games or other media, and recently posted activities by friends associated with the first user account.

When selected via a menu option, an online store may provide access to game software and media for download to the entertainment device. A welcome screen may highlight featured content. When a game is purchased or selected for download, it can be downloaded for example via the Wi-Fi connection 34 and the appropriate software and resources stored on the hard disk drive 37 or equivalent device. It is then copied to memory for execution in the normal way.

A system settings screen available as part of the operation of the operating system can provide access to further menus enabling the user to configure aspects of the operating system. These include setting up an entertainment device network account, and network settings for wired or wireless communication with the Internet; the ability to select which notification types the user will receive elsewhere within the user interface; login preferences such as nominating a primary account to automatically log into on start-up, or the use of face recognition to select a user account where the video camera 41 is connected to the entertainment device; parental controls, for example to set a maximum playing time and/or an age rating for particular user accounts; save data management to determine where data such as saved games is stored, so that gameplay can be kept local to the device or stored either in cloud storage or on a USB to enable game progress to be transferred between entertainment devices; system storage management to enable the user to determine how their hard disk is being used by games and hence decide whether or not a game should be deleted; software update management to select whether or not updates should be automatic; audio and video settings to provide manual input regarding screen resolution or audio format where these cannot be automatically detected; connection settings for any companion applications run on other devices such as mobile phones; and connection settings for any portable entertainment device 44, for example to pair such a device with the entertainment device so that it can be treated as an input controller and an output display for so-called 'remote play' functionality.

The user interface of the operating system may also receive inputs from specific controls provided on peripherals, such as the hand-held controller 43. In particular, a button to switch between a currently played game and the operating system interface may be provided. Additionally a button may be provided to enable sharing of the player's activities with others; this may include taking a screenshot or recording video of the current display, optionally together with audio from a user's headset. Such recordings may be uploaded to social media hubs such as the entertainment device network, Twitch®, Facebook® and Twitter®.

Audio Communication Between Connected Devices

Figure 2:
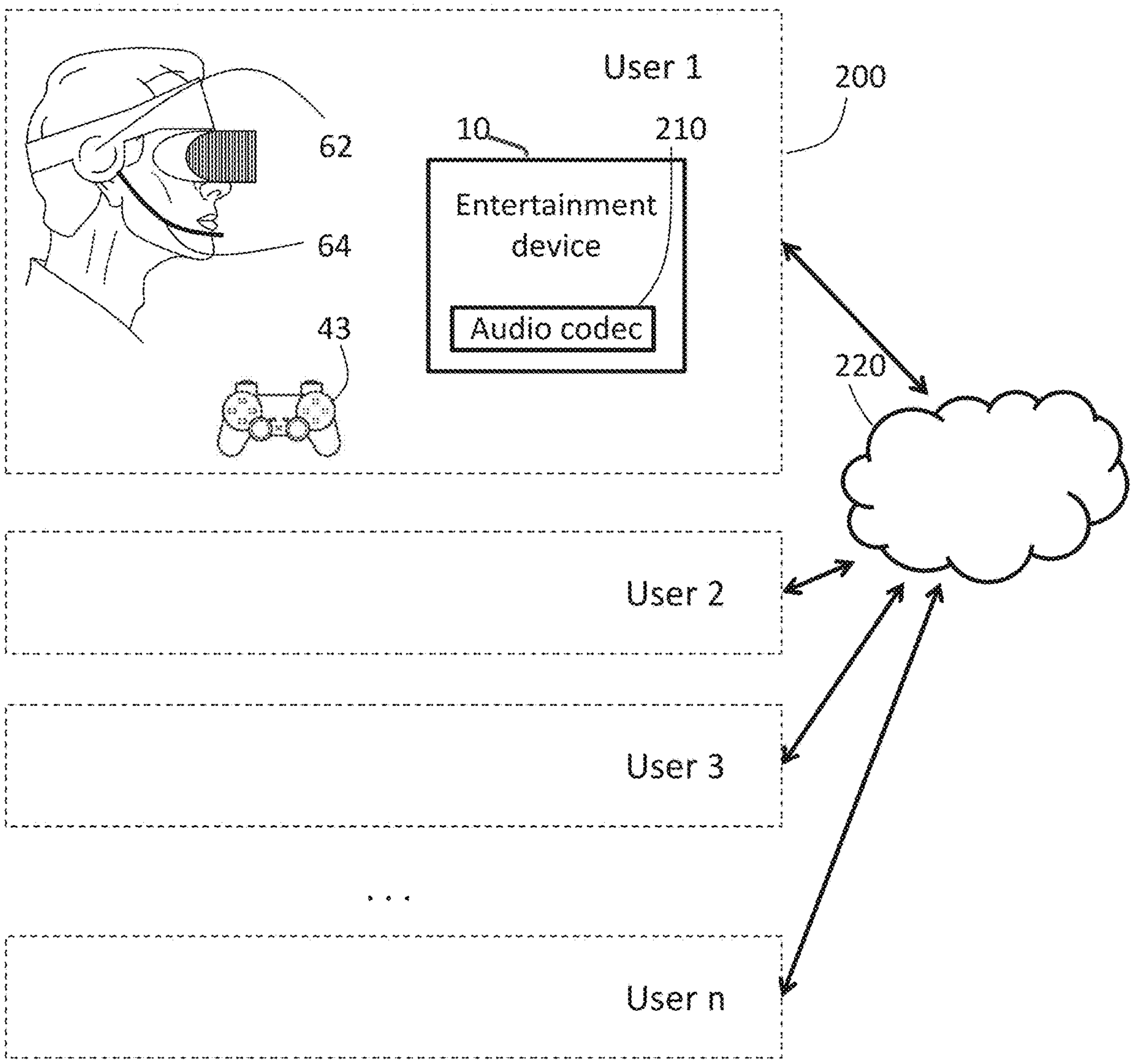
FIG. 2 schematically illustrates a networked set of the entertainment devices of FIG. 1.

FIG. 2 schematically illustrates an overview of audio communication between users associated with respective nodes or terminals 200 (designated in FIG. 2 by their respective user "User 1" . . . "User n"). Each node 200 may comprise an entertainment device 10, for example of the type shown in FIG. 1, and which implements an audio codec (coder-decoder) 210. The user wears an HMD as described above, including earphones 62 and a microphone 64, and may control operations using a controller 43. The nodes 200 are interconnected by a network connection such as an Internet connection 220 for communication of audio data and also other interaction data such as gameplay information to allow cooperative or competitive execution of computer game operations.

Audio Codec Example

Figure 3:
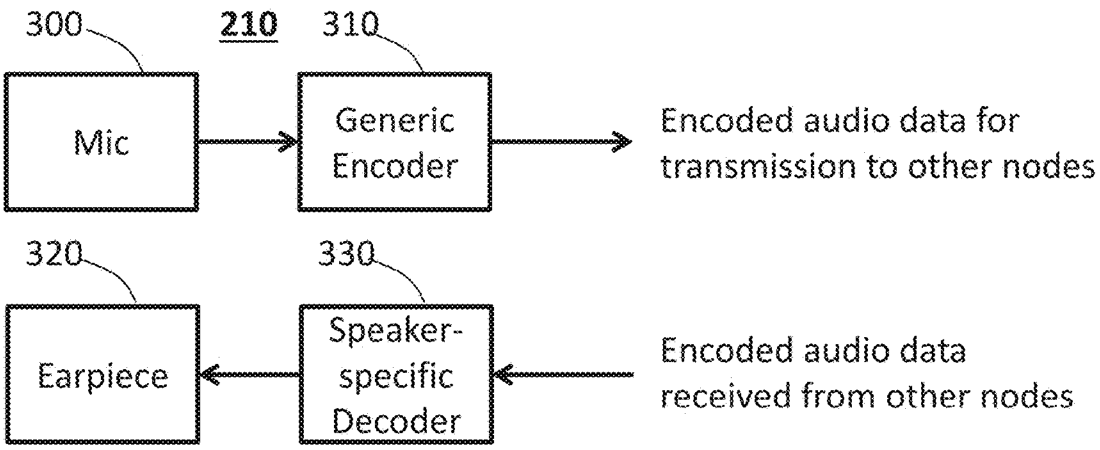
FIG. 3 schematically illustrates an audio encoder and an audio decoder implemented by the entertainment device of FIG. 1.

FIG. 3 schematically illustrates some aspects of the codec 210. An encoder 310 receives audio signals from a microphone 300 (such as the microphone 64 with an associated analogue to digital conversion stage) and generates encoded audio data for transmission to other nodes, such as a single mode in a point-to-point communication or multiple nodes in a broadcast style communication.

The encoder 310 is generic or user-agnostic, in that the encoded audio data which it generates is not dependent upon the vocal characteristics of the particular user currently speaking into the microphone 300. In examples, the encoders of the set of two or more audio communication nodes are identical and use the same encoding parameters.

At the decoder side, a decoder 330 receives encoded audio data from one or more other nodes, representing vocal contributions by users at those one or more other nodes, and decode it to an audio signal for supply to one or more in pieces 320 such as the earphones 62, possibly with an associated digital-to-analogue conversion stage.

In contrast to the user-agnostic encoding performed by the encoder 310, the decoding is user- or speaker-specific. That is to say, although the encoded audio data itself is user-agnostic, the decoding process performed by the decoder 330 is not user-agnostic but in fact is selected or tuned to the particular speaker or user associated with the encoded audio data. Techniques to achieve this will be discussed below.

The apparatus of FIG. 2, operating in accordance with the techniques of FIG. 3, provides an example of audio communication apparatus comprising a set of two or more audio communication nodes 200;

each audio communication node (for example, an entertainment device 10 configured to execute a computer game) comprising:

an audio encoder 310 controlled by encoding parameters to generate encoded audio data to represent a vocal input generated by a user of that audio communication node, the encoded data being agnostic to which user who generated the vocal input; and an audio decoder 330 controlled by decoding parameters to generate a decoded audio signal as a reproduction of a vocal signal generated by a user of another of the audio communication nodes, the decoding parameters being specific to the user of that other of the audio communication nodes.

A data connection 220 connects the set of two or more audio communication nodes for the transmission of encoded audio data between audio communication nodes of the set.

Example Audio Packet and Encoder/Decoder Parameters

Figure 4:
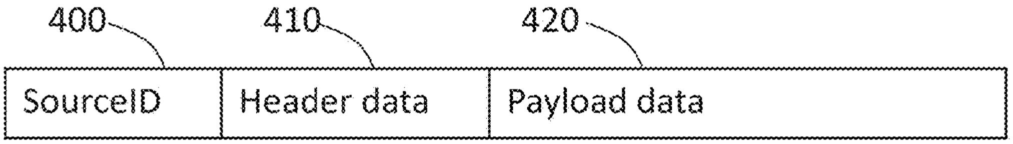
FIG. 4 is a schematic illustration of an audio packet.

FIG. 4 schematically illustrates an example audio packet as transmitted between the nodes 200 of FIG. 2, including a source identifier field 400 which indicates the user (or at least the node) from which the audio data in that packet originated, other header data 410 providing housekeeping functions and audio payloads data 420 representing the encoded audio data from that user. Significantly, the source identifier field 400 allows the identification, at a recipient node or device, of the appropriate decoding parameters to be used to decode that audio signal.

Therefore, in examples, the audio encoder of each audio communication node is configured to associate a user identifier (source identifier) with encoded audio data generated by that audio encoder.

Figure 5:
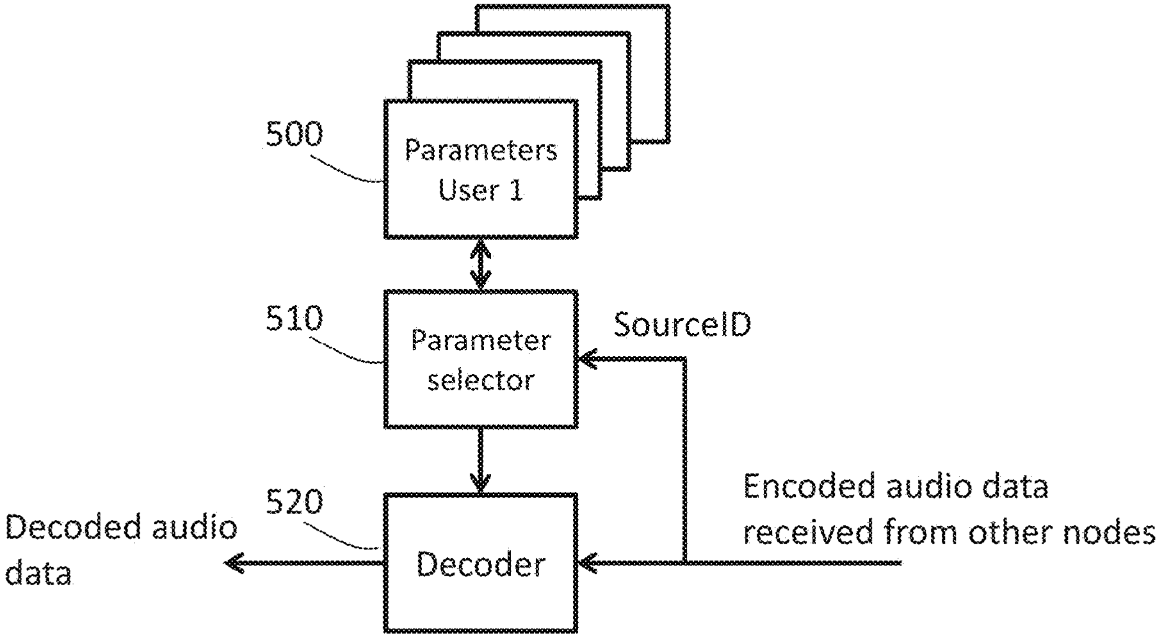
FIG. 5 schematically illustrates an audio decoder.

Referring to FIG. 5, encoded audio data, for example in the form of packets as shown in FIG. 4, is provided to a decoder 520. A parameter selector 510 is responsive to the source identifier 400 of the incoming encoded audio data to select between parameters 500 associated with different users and to provide the selected parameters to the decoder 524 decoding the payloads data of the received packet.

Note that in a multi-user conversation, a particular decoder may receive encoded audio data representing audio contributions from multiple users speaking at substantially the same time. However, by tagging the encoded audio data with a source identifier 400 when it is packetised at the transmitting device, it is possible to ensure that, on a packet-by-packet basis, each packet contains encoded audio data (as the payload data 420) from only one given user, so that as long as the parameter selection discussed in connection with FIG. 5 is performed on a packet basis, the appropriate decoding parameters can be selected for each instance of encoded audio data.

Figure 6:
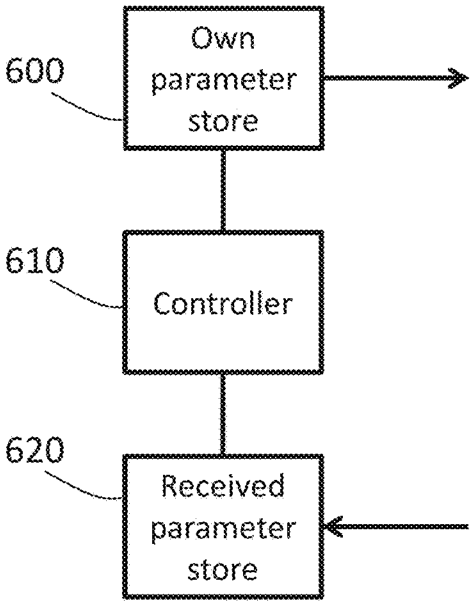
FIG. 6 schematically illustrates a part of the operation of the device of FIG. 1.

FIG. 6 schematically illustrates aspects of circuitry associated with the encoder 310 and the decoder 330 of FIG. 3 and which, in common with the encoder 310 and the decoder 330, may be implemented by the device of FIG. 1 operating under the control of a suitable program instructions.

A controller 610 executes control over parameter storage which, for the schematic purposes of FIG. 6, is partitioned into an "own parameter store" 600 and a "received parameter store" 620. The store 600 contains decoding parameters associated with the user who is operating that particular device or node, for example as identified by a login or face or other biometric identification process. That user is associated with the source identifier field 400 in encoded audio data packets transmitted or distributed by that node.

Note that the node itself does not require the decoding parameters contained in the "own parameter store" 600. These are simply for decoding at other nodes receiving audio communications from that node.

Separately (at least for the schematic purposes of FIG. 6) the "received parameter store" provide the functionality of the parameter storage 500 of FIG. 5, to store audio decoding parameters associated with other users within a cohort of users currently capable of sending audio communications to the given device.

Therefore in examples the audio decoder 330 of each audio communication node is configured to detect a user identifier (such as SourceID) associated with encoded audio data received from another of the audio communication nodes, and to select decoding parameters (for example from the "received parameter store" 620 for decoding that encoded audio data from two or more candidate decoding parameters 500 in dependence upon the detected user identifier.

The way in which the "received parameter store" 620 may be populated will be described with reference to an example schematic flowchart of FIG. 7.

Figure 7:
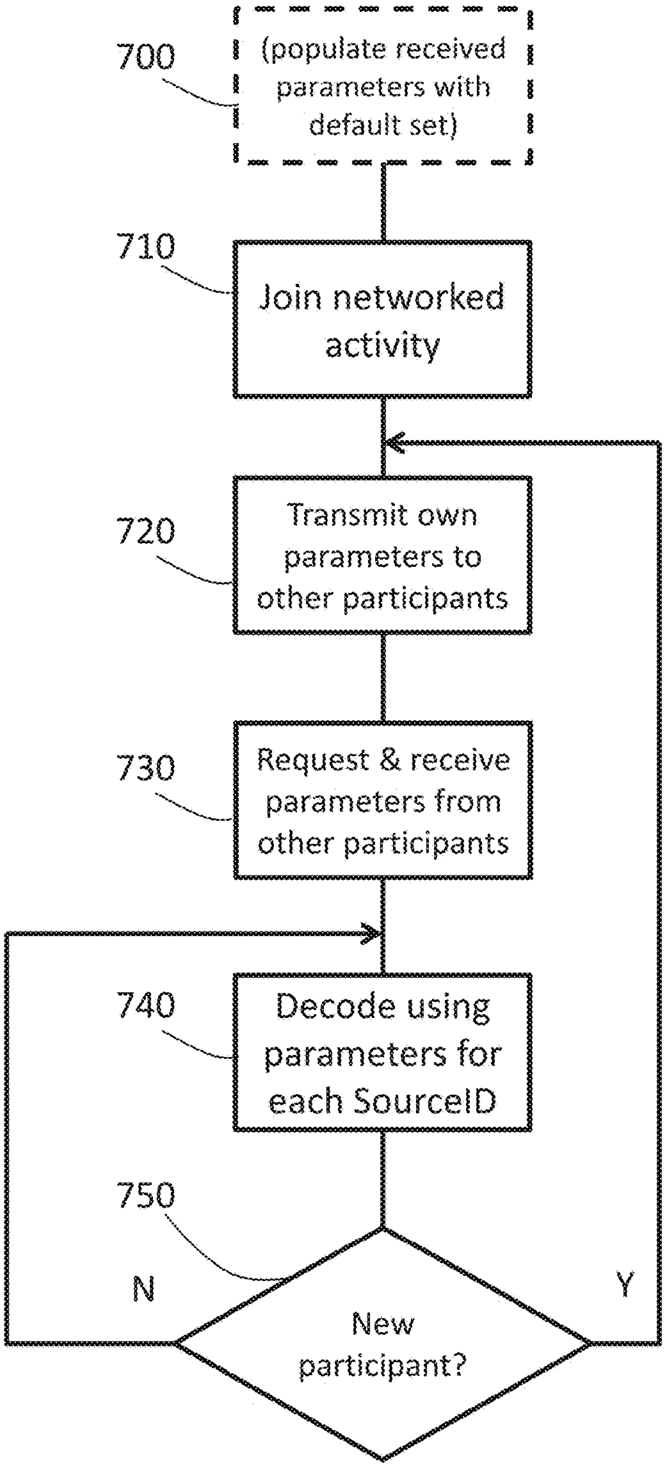
FIG. 7 is a schematic flowchart illustrating a method.

The operations of FIG. 7 refer to a particular (given) node and user. If the user associated with a node changes, the process of FIG. 7 can be repeated and decoding parameters associated with the previous user can be deleted (or simply left in place at other nodes given that they will no longer be used because no incoming packets will carry the source identifier associated with the superseded user).

At an optional starting step 700, the given node can populate its own received parameter store 620 with a default set of parameters which will at least allow decoding of incoming packets which are either received before the process of FIG. 7 is completed or received with an unrecognised source identifier.

At a step 710, the node joins a networked or connected activity with one or more other nodes. At a step 720, the given node transmits its own parameters from the "own parameter store" 600 to all other nodes associated with the networked or connected activity. This is an example of each audio communication node being configured to provide decoding parameters associated with the user of that audio communication device to another audio communication node configured to receive encoded audio data from that audio communication node.

Then, at a step 730, the given node issues a request for decoding parameters from other participants in the networked or connected activity, and receives and stores (in the received parameter store 620) decoding parameters received in response to the step 730.

In subsequent operation, each incoming audio packet is decoded by the given node using parameters associated with the source identifier of that audio packet, as stored in the received parameter store 620. As mentioned, if for any reason an unrecognised source identifier is received, then the default set of parameters stored at the step 700 may be used.

It is possible for the set of participants in an online or network connectivity to change during the course of the activity. If a new participant is identified at a step 750 then the steps 720, 730 are repeated. Otherwise, decoding continues using the step 740.

Example Auto-Encoder

In example embodiments the audio encoding and decoding functions are implemented by a so-called auto-encoder, such as a so-called Variational Auto-Encoder (VAE).

Figure 8:
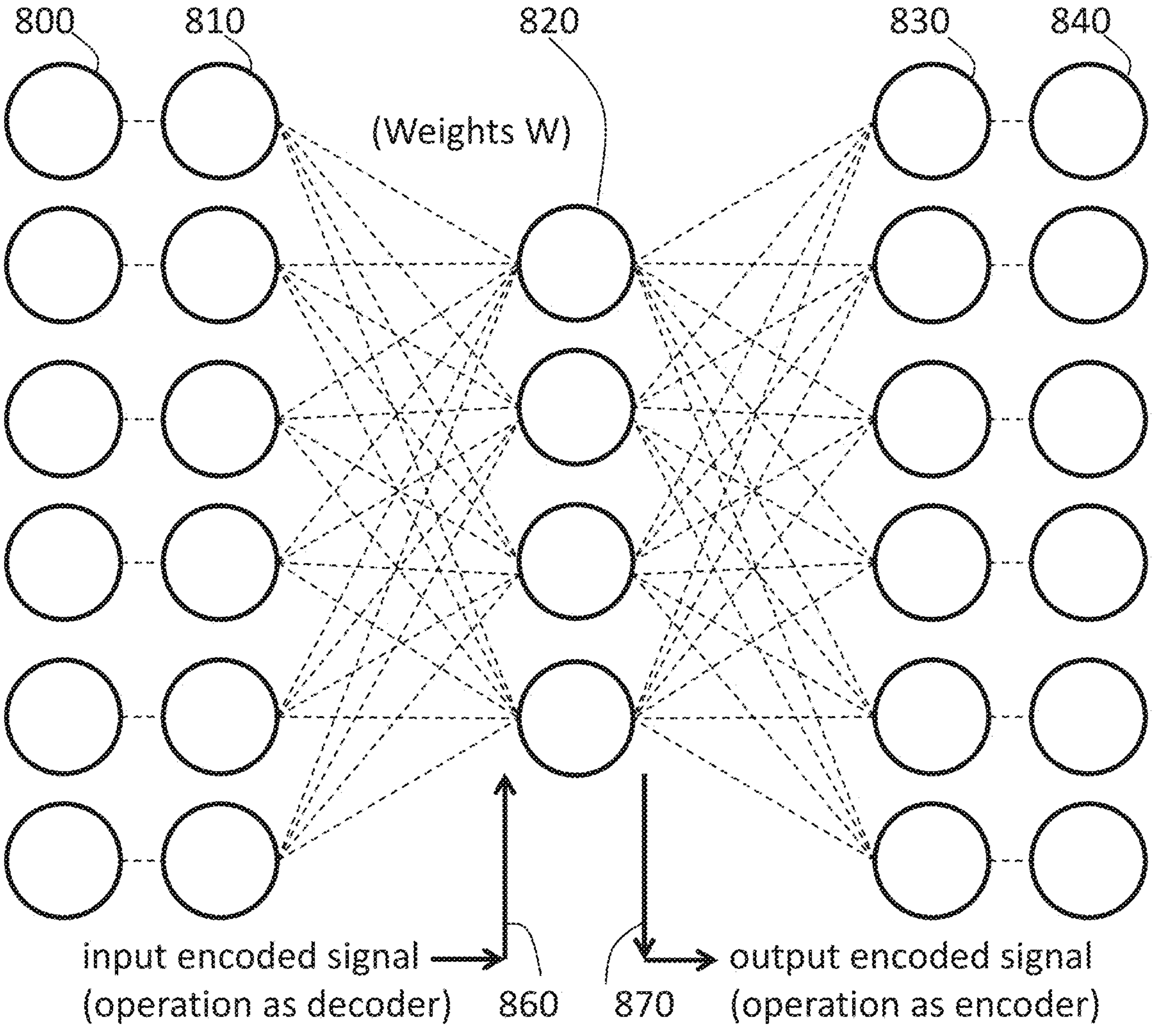
FIGS. 8 and 9 schematically illustrate an auto-encoder.

FIG. 8 schematically illustrates an auto-encoder. This is an example of an artificial neural network (ANN) and has specific features which force the encoding of input signals into a so-called representation, from which versions of the input signals can then be decoded.

In one type of example, the auto-encoder may be formed of so-called neurons representing an input layer 800, one or more encoding layers 810, one or more representation layers 820, one or more decoding layers 880 and an output layer 840. In order for the auto-encoder to encode input signals provided to the input layer into a representation that can be useful for the present purposes, a so-called "bottleneck" is included. In the particular example shown in FIG. 8, the bottleneck is formed by making one or more representational layers 820 smaller in terms of their number of neurons than the one or more encoding layers 810 and the one or more decoding layers 880. In other examples, however, this constraint is not required, but other techniques are used to impose a bottleneck arrangement, such as selectively disabling certain nodes at the encoding and/or decoding layers. In general terms, the use of a bottleneck prevents the auto-encoder from simply passing the inputs to the outputs without any change. Instead, in order for the signals to pass through the bottleneck arrangement, encoding into a different form is forced upon the auto-encoder.

In the example embodiments to be discussed here, the encoding is into an encoded form at the representational layers(s) in response to the weights or weighting parameters which control encoding by the one or more encoding layers and decoding by the one or more decoding layers. It is the representation at the representational layers which can be transmitted or otherwise communicated to another device for decoding.

In the context of the present techniques, FIG. 8 provides an example of an auto-encoder comprising:

one or more encoding layers;

one or more representational layers; and one or more decoding layers;

in which the one or more encoding layers, the one or more representational layers and the one or more decoding layers are configured to cooperate to encode and decode a representation of an audio signal.

Figure 9:
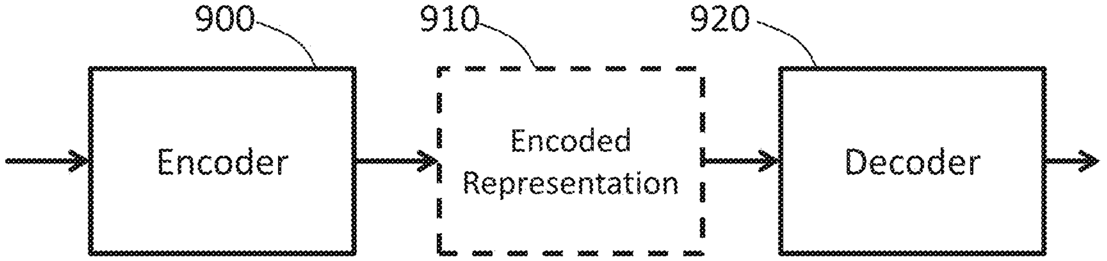

FIG. 9 summarises the operations described above, in that the layers 800, 810, 820 cooperate to provide the functionality of an encoder 900 generating an encoded representation 910. This can be directly output 870, for example via a further output layer (not shown) as an encoded audio signal for transmission to another device. At the recipient device, the encoded representation 910 can be input 860, for example via a further input layer (not shown) and the layers 820, 830, 840 provide the functionality of a decoder 920 to regenerate at least a version of the original audio signal as encoded.

A VAE is a specific type of auto-encoder in which a probability model is imposed on the encoded representation by the training process (in that deviations from the probability model are penalised by the training process).

Auto-encoders and VAEs have been proposed for use in audio encoding and decoding, for example with respect to the human voice. In the present examples, the encoder and/or decoder may be implemented as such auto-encoders (or ANNs in general) implemented by the PU 20 of the device 10, for example.

In examples using a VAE or an auto-encoder in general, the audio encoder and the audio decoder may comprise processor-implemented artificial neural networks; the encoding parameters comprise a first set of learned parameters; and the decoding parameters comprise a second set of learned parameters.

Training and Inference Processes

Figure 10:
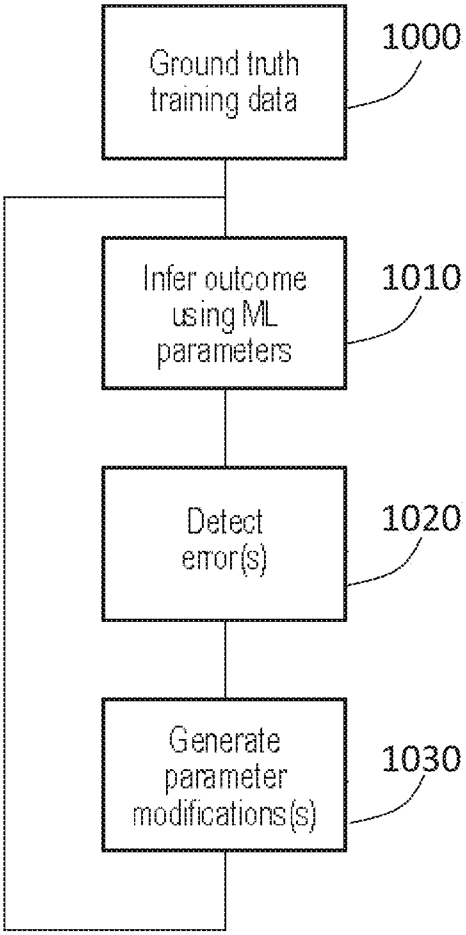
FIGS. 10 to 12 are schematic flowcharts illustrating respective methods.
Figure 11:
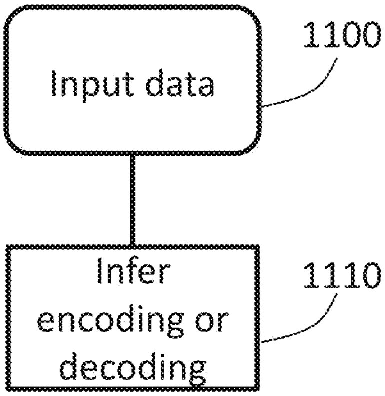

The operation of the encoder 900 and the decoder 920 (as implemented by the arrangement of FIG. 8) are controlled by trainable parameters such as so-called weights. Operation of the ANN of FIG. 8 may be considered as two phases: a training phase in which the weights are generated or at least adjusted, and an inference phase in which the weights are fixed and are used to provide encoding or decoding activities. FIG. 10 schematically illustrates a training process or phase and FIG. 11 schematically illustrates an inference process or phase.

Referring to FIG. 10, the training process is performed with respect to so-called ground truth training data 1000. This can include ground truth input data such as sampled audio inputs or the like. The particular use made of ground truth data will be discussed below.

During the training phase, an outcome, for example comprising an encoded and decoded audio signal (though other examples will be discussed below) is inferred at a step 1010 using machine learning parameters such as machine learning weights. At a step 1020, an error function between the outcomes associated with the ground truth training data 1000 and the inferred outcome at the step 1010 is detected, and at a step 1030, modifications to the parameters such as machine learning weights are generated and applied for the next iteration of the steps 1010, 1020, 1030. Each iteration can be carried out using different instances of the ground truth training data 1000, for example.

Examples of techniques by which encoders and decoders are collectively or separately trained using these techniques will be discussed below.

In an inference phase of the trained machine-learning processor (FIG. 11), either an input audio signal or an encoded audio signal is provided as an input signal at a step 1100, and then, at a step 1110, an outcome, in terms of an encoded audio signal or a decoded audio signal respectively, is inferred using the trained machine learning parameters generated as described above.

Figure 12:
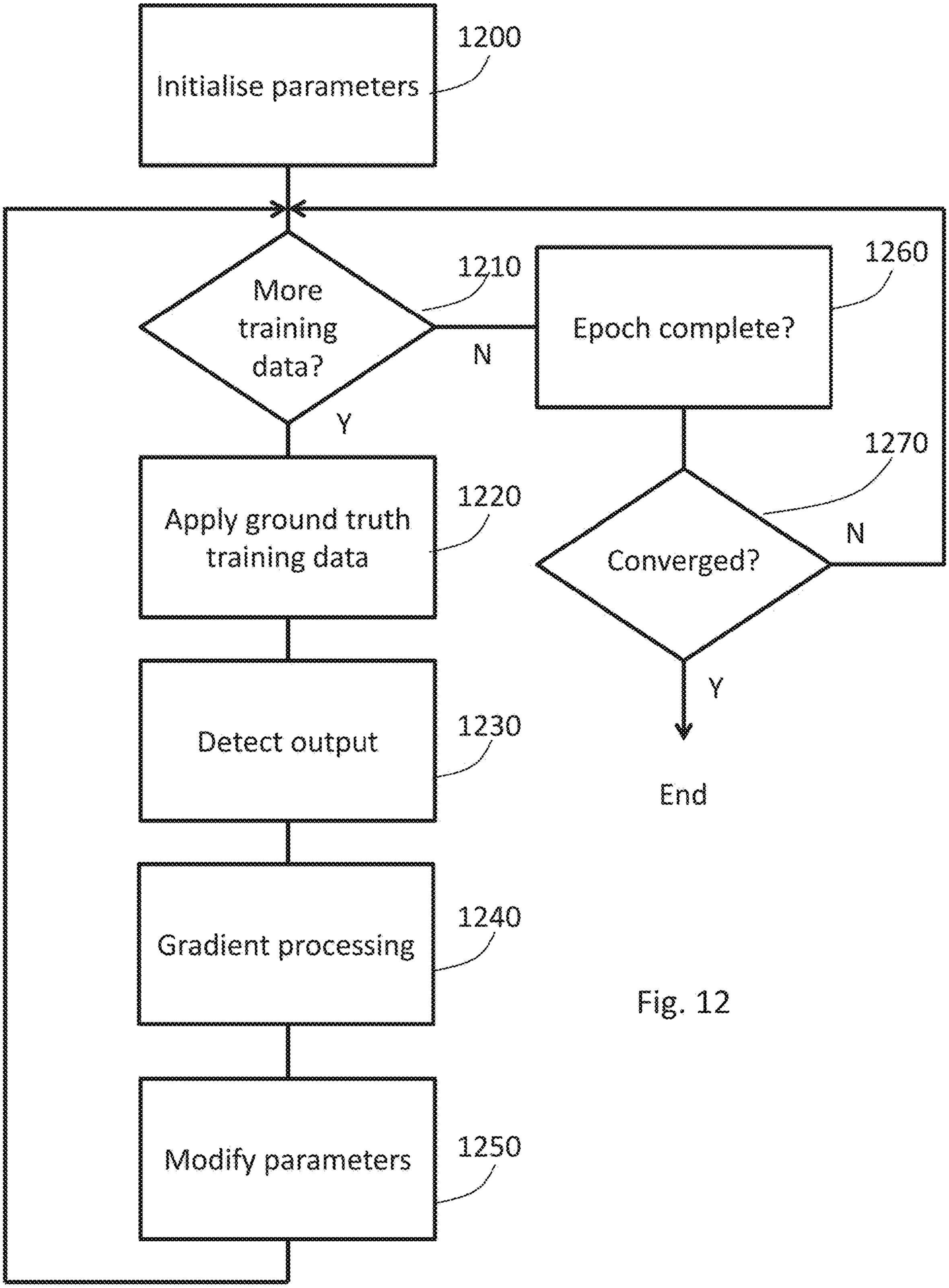

FIG. 12 is a schematic flowchart illustrating in more detail the training method of FIG. 10.

At a step 1200, a set of weights W appropriate to the function being trained are initialised to initial values. Then, a loop arrangement continues as long as there is (as established at a step 1210) more training data available for an "epoch". Here, an epoch represents a set or cohort of training data.

Once there is no more training data available in a particular epoch (and training of an ANN may use, say, 50-10000 epochs), the epoch is complete at a step 1260. If there are further epochs at a step 1270, for example because the ANN parameters are not yet sufficiently converged, then the loop arrangement continues further via the step 1210; if not then the process ends.

At steps 1220 and 1230, the ground truth data of the current epoch is processed by the ANN under training, and the output resulting from processing using the ANN is detected.

At a step 1240, the reconstruction error between the ground truth input signals and the generated output is detected and so-called gradient processing is performed.

At a basic level an error function can represent how far the ANN's output is from the expected output, though error functions can also be more complex, for example imposing constraints on the weights such as a maximum magnitude constraint. The gradient represents a partial derivative of the error function with respect to a parameter, at the parameter's current value. If the ANN were to output the expected output, the gradient would be zero, indicating that no change to the parameter is appropriate. Otherwise, the gradient provides an indication of how to modify the parameter towards achieving more closely the expected output. A negative gradient indicates that the parameter should be increased to bring the output closer to the expected output (or to reduce the error function). A positive gradient indicates that the parameter should be decreased to bring the output closer to the expected output (or to reduce the error function).

Gradient descent is therefore a training technique with the aim of arriving at an appropriate set of parameters without the processing requirements of exhaustively checking every permutation of possible values. The partial derivative of the error function is derived for each parameter, indicating that parameter's individual effect on the error function. In a backpropagation process, starting with the output neuron(s), errors are derived representing differences from the expected outputs and these are then propagated backwards through the network by applying the current parameters and the derivative of each activation function. A change in an individual parameter is then derived in proportion to the negated partial derivative of the error function with respect to that parameter and, in at least some examples, having a further component proportional to the change to that parameter applied in the previous iteration.

Finally, at a step 1250 the one or more learned parameters such as weights W are updated in dependence upon the reconstruction error as processed by the gradient processing step.

Training of Encoder and Decoder Parameters

This process will now be described with reference to FIGS. 13 to 15. The aims of the training process may be summarised as follows:

train a generic (user-agnostic) encoder; and train a user-specific decoder

With regard to the training of the user-agnostic encoder, a basic arrangement will be described with reference to FIG. 13, and then potential modifications of that arrangement will be discussed with reference to FIG. 14. FIG. 15 refers to the training of a user-specific decoder.

Training a User-Agnostic Encoder

Figure 13:
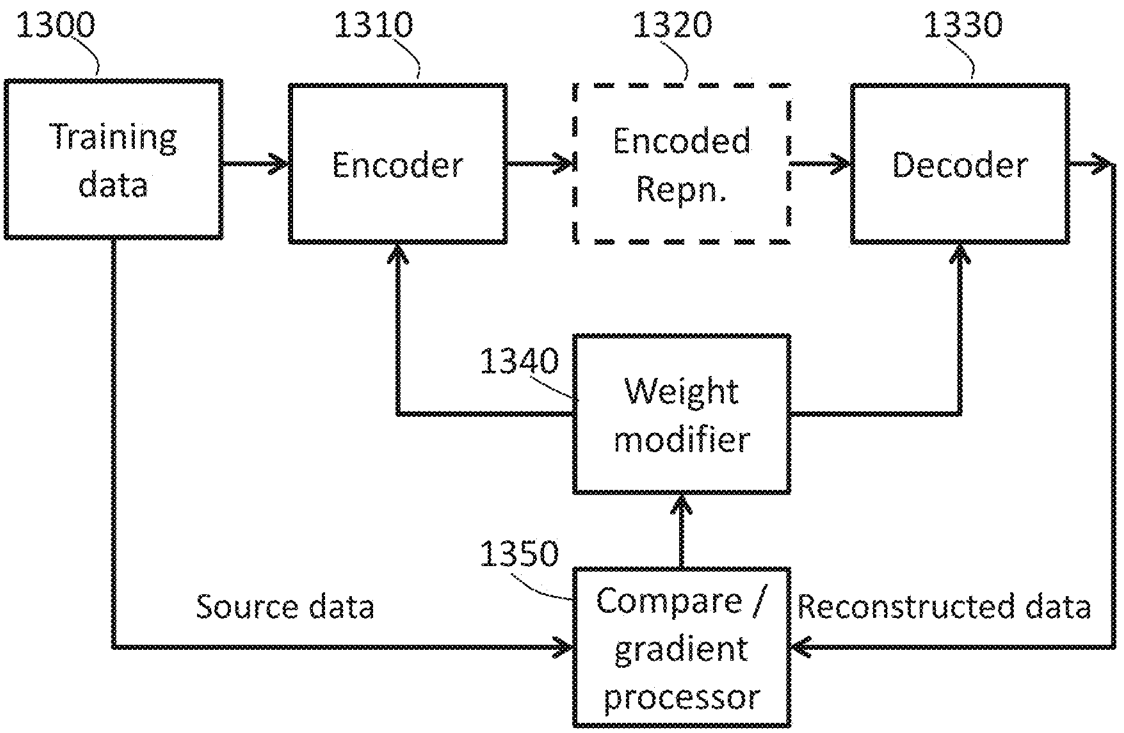
FIGS. 13 to 15 schematically illustrate example training arrangements.

Referring to FIG. 13, training data 1300 is provided as an ensemble of multiple users' voices. Using the techniques of FIG. 12, this training data is provided to an encoder 1310 under training, which generates an encoded representation 1320 for decoding by a decoder 1330 under training. Data reconstructed by the decoder 1330 is compared to the equivalent source data of the training data 1300 by a comparator 1350, and a weight modifier 1340 modifies the weights W at the encoder 1310 and the decoder 1330 under training.

The result here is to generate a user-agnostic encoder and associated decoder. The trained parameters of the user-agnostic decoder can be used at the step 700 described above.

In a modification of this arrangement, the training data 1300 has an associated source identifier (SourceID) indicating the user whose voices represented by a particular instance of training data. As well as the decoder 1330 described above, the encoded representation 1320 is also provided to a source identifier predictor 1400 which, under the control of learned weights (in training) aims to predict the source identifier from the encoded representation 1320 alone. A modified comparator 1410 receives not only the source data and the reconstructed data but also the source identifier and the predicted source identifier. Gradient processing is performed so as to bring the reconstructed data closer to the source data but to vary the weights of the encoder 1310 so as to decrease the success of the source identifier predictor 1400. In this way, the prediction of the source identifier forms a negative indication of success by the encoder 1310 and is used as such in the gradient processing and weight modification processes.

Figure 14:
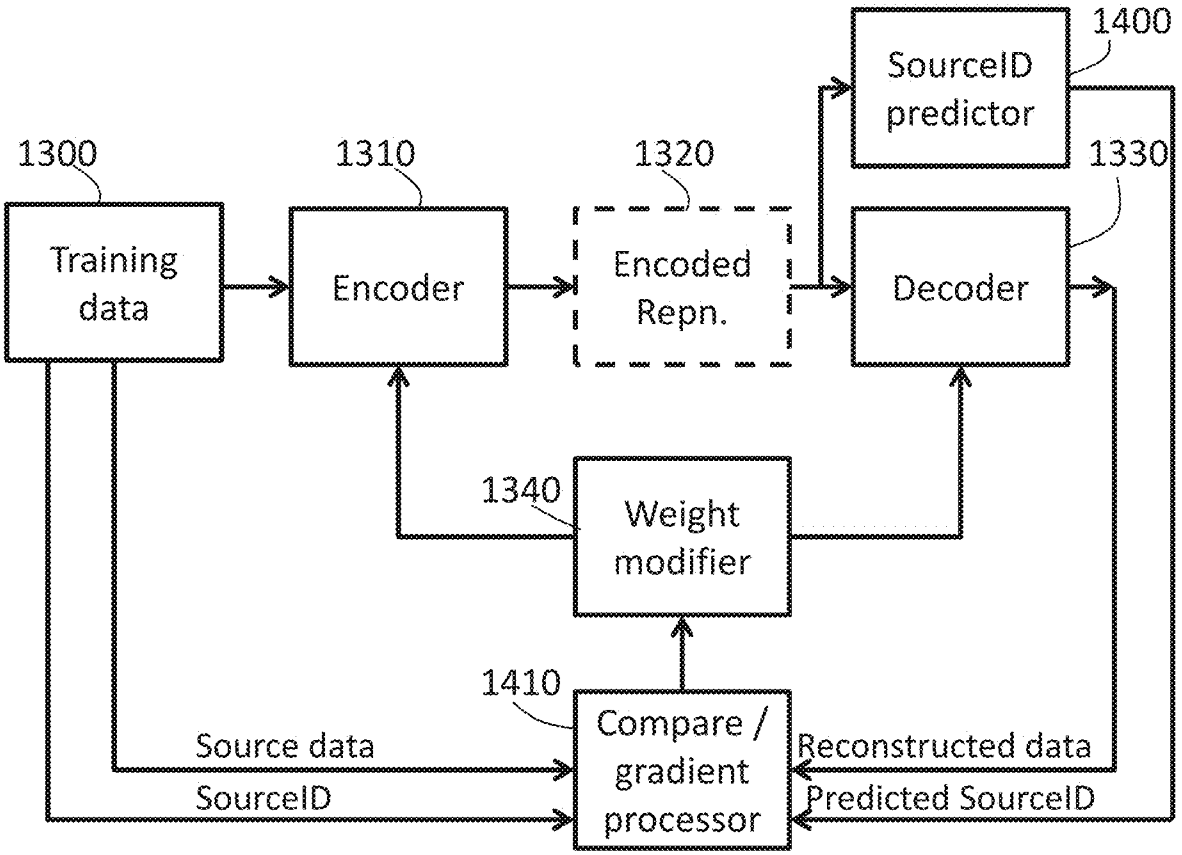

After following the process of FIG. 12 using the apparatus of FIG. 13 or FIG. 14, the result is a trained encoder aiming to generate an encoded representation 1320 which is user-agnostic. The training of the decoder 1330 in FIG. 13 or 14 is in some ways a "by-product" but as discussed the generic decoder 1330 may be used at the step 700 or elsewhere.

Training a User-Specific Decoder

Figure 15:
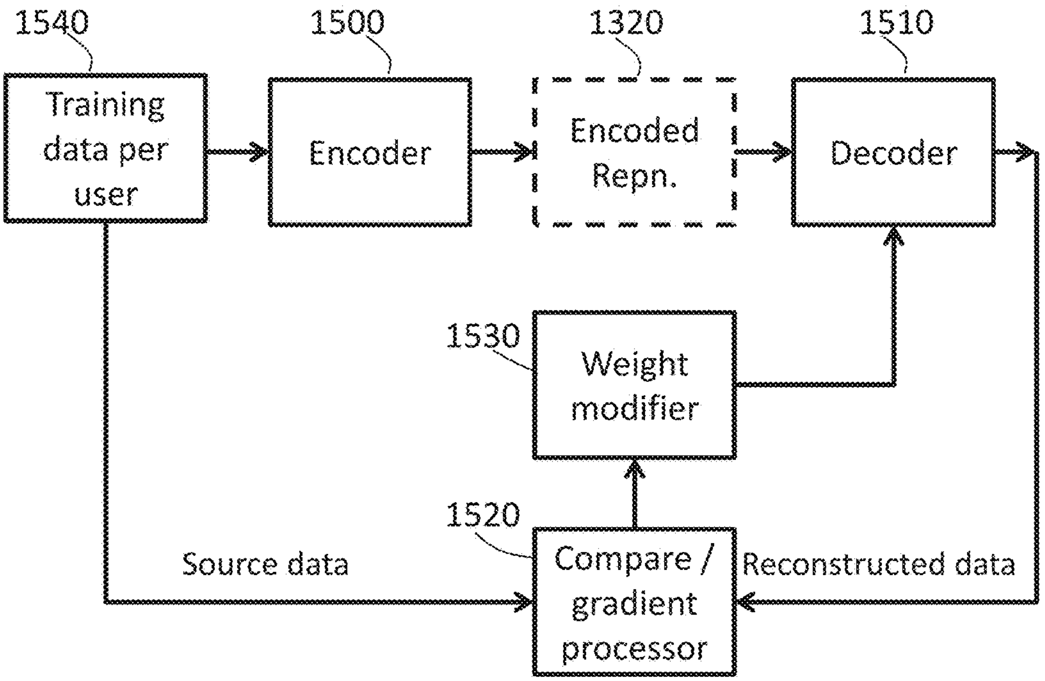

Referring now to FIG. 15, a training process is carried out to train a user-specific decoder 1510 by a weight modifier 1530 modifying weights associated with the decoder 1510 alone, in response to comparison and gradient processing by a comparator 1520. A user-agnostic encoder 1500, for example being the result of the encoder training process described above with reference to FIGS. 13 and 14, is used in this process but is no longer subject to training itself.

In this process, the training data 1540 which is used relates to a specific user and the result is a decoder 1510 trained to decode the generic (user-agnostic) encoded representation 1320 generated by the encoder 1500 into a reproduction of the voice of the specific user to whom the training data relates.

Therefore, in operation during a training phase, the user-specific training data 1540 is encoded by the user-agnostic encoder 1500 to generate a user-agnostic encoded representation 1320 which is then decoded by the decoder 1510 under training. The reconstructed data output by the decoder 1510 is compared by the comparator 1520 with the corresponding source data and modifications to the weights W of the decoder 1510 are generated by the weight modifier 1530, so as to more closely approximate the specific user's voice in the decoded audio signal generated by the decoder 1510 notwithstanding the fact that the encoded representation 1320 is user-agnostic.

Example Data Processing Apparatus

Figure 16:
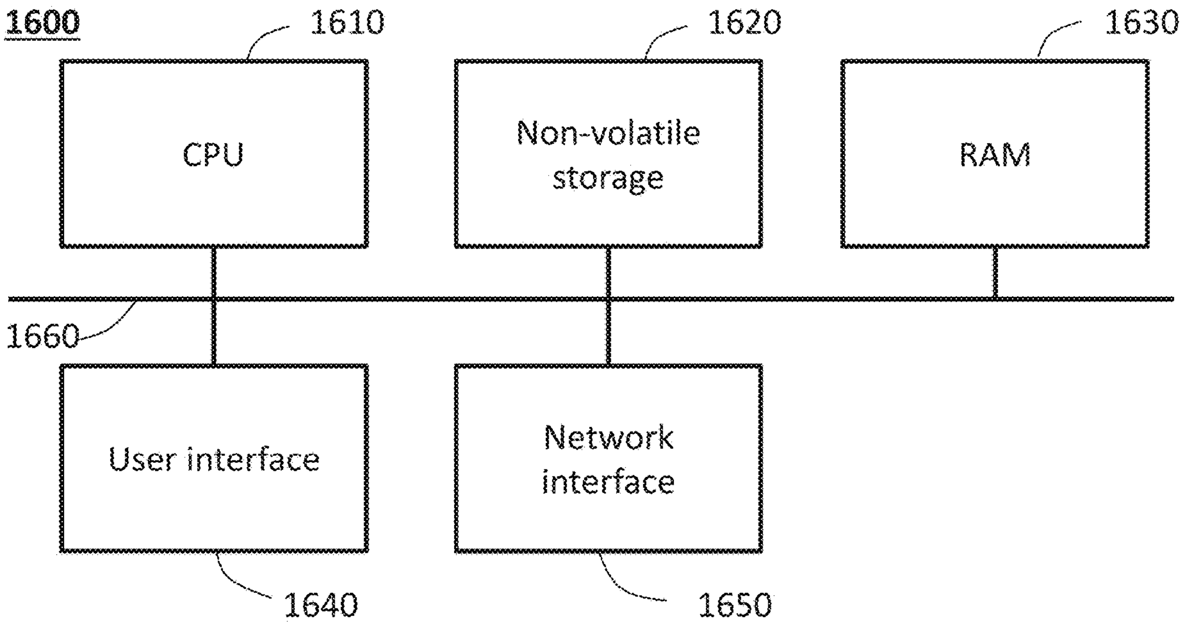
FIG. 16 schematically illustrates a data processing apparatus.

FIG. 16 provides a schematic example of a data processing apparatus 1600 suitable for performing the training methods discussed here. The example apparatus comprises a central processing unit (CPU) 1610, non-volatile storage 1620 (for example, a magnetic or optical disk device, a so-called solid state disk (SSD) device, flash memory or the like, providing an example of a machine-readable non-volatile storage device to store computer software by which the apparatus 1600 performs one or more of the present methods), a random access memory (RAM) 1630, a user interface 1640 such as one or more of a keyboard, mouse and a display, and a network interface 1650, all interconnected by a bus structure 1660. In operation, computer software to control the operation of the apparatus 1600 is stored by the non-volatile storage 1620 and is executed by the CPU 1610 to implement the methods discussed here, possibly with a temporary copy of the computer software and/or working data being held by the RAM 1630.

Summary Method

Figure 17:
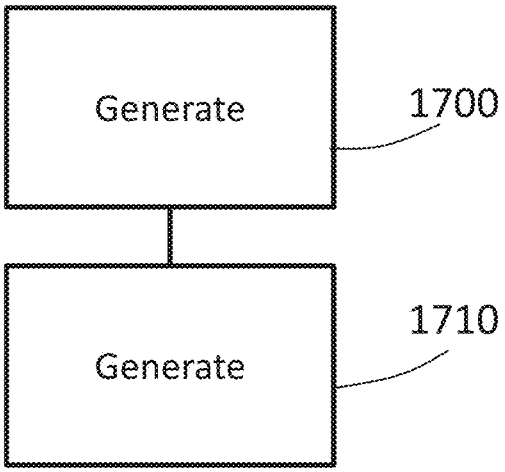
FIGS. 17 and 18 are schematic flowcharts illustrating respective methods.

FIG. 17 is a schematic flowchart illustrating a summary machine-implemented method of audio communication between a set of two or more audio communication nodes, the method comprising:

at each audio communication node, generating (at a step 1700), in dependence upon encoding parameters, encoded audio data to represent a vocal input generated by a user of that audio communication node, the encoded data being agnostic to which user who generated the vocal input; and at each audio communication node, generating (at a step 1710), in response decoding parameters, a decoded audio signal as a reproduction of a vocal signal generated by a user of another of the audio communication nodes, the decoding parameters being specific to the user of that other of the audio communication nodes.

Figure 18:
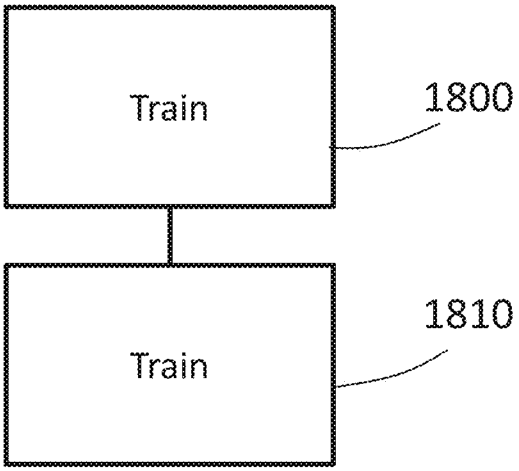

FIG. 18 is a schematic flowchart illustrating a summary computer-implemented method of artificial neural network (ANN) training to provide an audio encoding and/or decoding function, the method comprising:

training (at a step 1800) an ANN to act as a user-agnostic audio encoder;

using the user-agnostic audio encoder to generate user-agnostic encoded audio data in respect of an input vocal signal for a given user, training (at a step 1810) an ANN to decode the user-agnostic encoded audio data to approximate the input vocal signal for the given user.

The method of FIG. 17 may be implemented by, for example, the set of nodes of FIG. 2, for example operating under software control.

The method of FIG. 18 may be implemented, for example, by the apparatus of FIG. 16, for example operating under software control. Embodiments of the disclosure include an artificial neural network (ANN) generated trained by such a method and to data processing apparatus (for example, FIG. 16) comprising one or more processing elements to implement such an ANN.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

The invention claimed is:

1. An audio communication apparatus comprising a set of two or more audio communication nodes;

each audio communication node comprising:

an audio encoder controlled by encoding parameters to generate encoded audio data to represent a vocal input generated by a user of that audio communication node, the encoded audio data being agnostic to the user that generated the vocal input; and an audio decoder controlled by decoding parameters to generate a decoded audio signal as a reproduction of a vocal signal generated by a user of another audio communication node of the set of two or more audio communication nodes, the decoding parameters being specific to the user of the another audio communication node of the set of two or more audio communication nodes, wherein:

the audio encoder of each audio communication node of the set of two or more audio communication nodes is configured to include both a user identifier for indicating a user of that audio communication node and encoded audio data generated by that audio encoder in a given audio packet to be transmitted to another audio communication node of the set of two or more audio communication nodes, the audio decoder of each audio communication node of the set of two or more audio communication nodes is configured to detect a user identifier in an audio packet including encoded audio data received from another audio communication node of the set of two or more audio communication nodes, and to select decoding parameters for decoding that encoded audio data included in the audio packet from two or more candidate decoding parameters associated with respective different users among a plurality of different users in dependence upon the detected user identifier, wherein the selected decoding parameters are stored in a parameter storage unit, which stores decoding parameters associated with the plurality of different users currently capable of sending audio communications to the audio communication apparatus.

2. The audio communication apparatus of claim 1, comprising a data connection to connect the set of two or more audio communication nodes for the transmission of encoded audio data between audio communication nodes of the set.

3. The audio communication apparatus of claim 1, in which the audio encoders of the set of two or more audio communication nodes are identical and use the same encoding parameters.

4. The audio communication apparatus of claim 1, in which each audio communication node is configured to provide decoding parameters associated with the user of that audio communication device to another audio communication node configured to receive encoded audio data from that audio communication node.

5. The audio communication apparatus of claim 1, in which the audio encoder and the audio decoder comprise processor-implemented artificial neural networks;

the encoding parameters comprise a first set of learned parameters; and the selected decoding parameters comprise a second set of learned parameters.

6. The audio communication apparatus of claim 1, in which each audio communication node comprises an entertainment device configured to execute a computer game.

7. A machine-implemented method of audio communication between a set of two or more audio communication nodes, the method comprising:

at each audio communication node, generating, in dependence upon encoding parameters, encoded audio data to represent a vocal input generated by a user of that audio communication node, the encoded audio data being agnostic to the user that generated the vocal input; and at each audio communication node, generating, in response to decoding parameters, a decoded audio signal as a reproduction of a vocal signal generated by a user of another audio communication node of the set of two or more audio communication nodes, the decoding parameters being specific to the user of the another audio communication node of the set of two or more audio communication nodes, wherein:

the generating the encoded audio data including providing, by an audio encoder of each audio communication node of the set of two or more audio communication nodes, both a user identifier for indicating a user of that audio communication node and encoded audio data generated by that audio encoder in a given audio packet to be transmitted to another audio communication node of the set of two or more audio communication nodes, and the generating the decoded audio signal including: (i) detecting, by an audio decoder of each audio communication node of the set of two or more audio communication nodes, a user identifier in an audio packet including encoded audio data received from another audio communication node of the set of two or more audio communication nodes, and (ii) selecting decoding parameters for decoding that encoded audio data included in the audio packet from two or more candidate decoding parameters associated with respective different users among a plurality of different users in dependence upon the detected user identifier, wherein the selected decoding parameters are stored in a parameter storage unit, which stores decoding parameters associated with the plurality of different users currently capable of sending audio communications to a given one of the communication nodes.

8. The machine-implemented method of claim 7, comprising artificial neural network (ANN) training steps to provide an audio encoding and decoding function at each of the two or more audio communication nodes, the artificial neural network (ANN) training steps comprising:

training an ANN to act as a user-agnostic audio encoder; and training an ANN to act as a user-specific audio decoder, by carrying out actions comprising:

at each of the audio communication nodes, generating the encoded audio data using the ANN trained to act as the user-agnostic audio encoder; and at each of the audio communication nodes, generating the decoded audio signal using the ANN trained to act as the user-specific audio decoder.

9. The machine-implemented method of claim 8, in which the artificial neural network (ANN) training steps comprise generating a set of learned parameters to control operation of at least one of the ANN to act as the user-agnostic audio encoder, and the ANN to act as the user-specific audio decoder.

10. The machine-implemented method of claim 9, in which the step of training an ANN to act as a user-agnostic audio encoder comprises:

using a user detector to differentiate users from encoded audio data generated by the user-agnostic audio encoder; and varying the learned parameters for the user-agnostic audio encoder to penalise the differentiation of users from encoded audio data generated by the user-agnostic audio encoder.

11. A non-transitory, machine-readable storage medium which stores computer software which, when executed by a computer, causes the computer to perform a machine-implemented method of audio communication between a set of two or more audio communication nodes, the method comprising:

at each audio communication node, generating, in dependence upon encoding parameters, encoded audio data to represent a vocal input generated by a user of that audio communication node, the encoded audio data being agnostic to the user that generated the vocal input; and at each audio communication node, generating, in response to decoding parameters, a decoded audio signal as a reproduction of a vocal signal generated by a user of another audio communication node of the set of two or more audio communication nodes, the decoding parameters being specific to the user of the another audio communication node of the set of two or more audio communication nodes, wherein:

the generating the encoded audio data including providing, by an audio encoder of each audio communication node of the set of two or more audio communication nodes, both a user identifier for indicating a user of that audio communication node and encoded audio data generated by that audio encoder in a given audio packet to be transmitted to another audio communication node of the set of two or more audio communication nodes, and the generating the decoded audio signal including: (i) detecting, by an audio decoder of each audio communication node of the set of two or more audio communication nodes, a user identifier in an audio packet including encoded audio data received from another audio communication node of the set of two or more audio communication nodes, and (ii) selecting decoding parameters for decoding that encoded audio data included in the audio packet from two or more candidate decoding parameters associated with respective different users among a plurality of different users in dependence upon the detected user identifier, wherein the selected decoding parameters are stored in a parameter storage unit, which stores decoding parameters associated with the plurality of different users currently capable of sending audio communications to a given one of the communication nodes.

12. The non-transitory, machine-readable storage medium of claim 11, wherein the method further comprises artificial neural network (ANN) training steps to provide an audio encoding and decoding function at each of the two or more audio communication nodes, the artificial neural network (ANN) training steps comprising:

training an ANN to act as a user-agnostic audio encoder; and training an ANN to act as a user-specific audio decoder by carrying out actions comprising:

at each of the audio communication nodes, generating the encoded audio data using the ANN trained to act as the user-agnostic audio encoder; and at each of the audio communication nodes, generating the decoded audio signal using the ANN trained to act as the user-specific audio decoder.

* * * * *